United States Patent
Zhang et al.

(10) Patent No.: US 7,504,046 B2
(45) Date of Patent: Mar. 17, 2009

(54) POLYMER GRAFTED ALKALINE EARTH ALUMINATE PHOSPHOR THROUGH COORDINATION BOND

(75) Inventors: Shufen Zhang, Dalian (CN); Suli Wu, Dalian (CN); Jinzong Yang, Dalian (CN)

(73) Assignee: Dalian University of Technology, Dalian (CN)

( * ) Notice: Subject to any disclaimer, the term of this patent is extended or adjusted under 35 U.S.C. 154(b) by 281 days.

(21) Appl. No.: 11/507,984

(22) Filed: Aug. 22, 2006

(65) Prior Publication Data

US 2007/0221886 A1    Sep. 27, 2007

(30) Foreign Application Priority Data

Mar. 24, 2006   (CN) ................ 2006 1 0046187

(51) Int. Cl.
  *C09K 11/02*  (2006.01)
(52) U.S. Cl. .............. 252/301.36; 252/301.16; 524/403; 524/437
(58) Field of Classification Search ........ 252/301.16, 252/301.36
See application file for complete search history.

(56) References Cited

U.S. PATENT DOCUMENTS 6,013,979 A     1/2000  Picht et al.

FOREIGN PATENT DOCUMENTS

| CN | 1718671 | * | 1/2006 |
| CN | 200510046920.8 | | 1/2006 |
| JP | 9-003449 | | 1/1997 |
| JP | 9-125056 | | 5/1997 |

* cited by examiner

*Primary Examiner*—C. Melissa Koslow
(74) *Attorney, Agent, or Firm*—Connolly Bove Lodge & Hutz LLP (57) ABSTRACT

The invention provides a kind of polymer grafted long afterglow phosphor which composed of alkali earth aluminate phosphor grafted by polymer through coordination bond and a method for producing the same. The method for producing a polymer grafted phosphor comprise two steps: the alkali earth aluminate activated by rare earth ions is coordinated with difunctional ligand to form a coordinated long afterglow phosphor; The coordinated long afterglow phosphor was dispersed in organic solvent at 40~130° C., the ligand was initiated by initiator and could copolymerize with other polymerizable monomer to form the polymer grafted long afterglow phosphor. The formed phosphors have good water resistance and luminescent properties. They can be widely used in fields of luminescent coatings, paints and plastics.

10 Claims, 1 Drawing Sheet

POLYMER GRAFTED ALKALINE EARTH ALUMINATE PHOSPHOR THROUGH COORDINATION BOND

BACKGROUNDS OF THE INVENTION

This invention related to a kind of polymer grafted long afterglow phosphor which composed of alkali earth aluminate phosphor grafted by polymer through coordination bond and a method for producing the same.

Although rare earth ions activated alkali earth aluminate phosphors are widely used for such diverse "glow-in-the-dark" items as golf balls, rubber shoe soles, a variety of toys, safe helmets, direction indicators and signs and the like due to their better safe, chemically stable, excellent photoresistance, very bright and long-lasting afterglow with no radiation, these phosphors are sensitive to environmental conditions such as moisture, they are unstable in air because of their chemical activity. In addition, unmodified inorganic phosphor powders will conglomerate because of the surface electricity. They are sensitive to water, so when exposed to moisture conditions, their luminescence efficiency will decrease fast. When inorganic phosphor was used in polymer, it was difficult to obtain a homogeneous dispersion of the particles in the polymer matrix owing to their high density, poor compatibility with organics. Introduction of hydrophobic organics onto the surface of aluminate phosphors will increase their stability and compatibility with organics.

To attempt to overcome the above problems, physical or chemical modifications have been made on the surface of rare earth ions activated alkaline earth aluminate phosphors. U.S. Pat. No. 6,013,979 disclosed a method of introducing inorganic oxides such as $SiO_2$, $AlO_3$ onto the surface of aluminate phosphors to increase their stability, but this method can't increase the compatibility of inorganics with organics. Resins were used to modify the surface properties of inorganic phosphor in J.Pat.No.09125056. Organic compounds with both hydrophobic and hydrophilic groups were introduced onto the surface of aluminate phosphors to increase their water resistance in J.Pat.No.09003449. Although above methods can increase the stability and compatibility of aluminate phosphors with organics in some degree, the interaction between the coating layer and phosphor's surface is hydrogen bonding and Van der waals forces or Van der waals forces alone which belong to physisorption. Therefore, desorption can occur upon exposure to a good solvent or the polymer can be displaced by other polymers or low molecular weight compounds present in the ambient, which compete for adsorption sites at the surface. The decrease in the interaction between the polymer and the substrate due to the displacement of the polymer molecules, however, leads to strong changes in the physical properties of the layers. Furthermore, the obtained films are often thermally unstable due to the weak interaction between the polymer and the solid substrate. The organic or polymer film coated inorganic materials can be obtained by physisorption or chembond. A much stronger adhesion between the organics or polymers and the substrate is achieved if the macromolecules are covalently bond to the surface.

C.N.Pat.200510046920.8 applied by the inventor discloses an invention to introduce small organic molecules onto the surface of rare earth ions activated alkaline earth aluminate phosphors by coordinate bonding. Herein the stability and compatibility of them with organics were increased. However, these are not enough to meet the need of applications because the sites which can coordinate with organics are limited and the stability of the small organic molecules is poor.

There accordingly remains a need in the art for alternative approaches for the good adhesion of aluminates phosphor with organics or polymers. There further remains a need for methods to introduce enough stable organics to increase the stability and compatibility with organics of the aluminates phosphor.

An object of the invention was to provide a kind of polymer grafted long afterglow phosphor, which composed of alkaline earth aluminate phosphor grafted by polymer through coordination bond and a method for producing the same. The polymer grafted long afterglow phosphors have good water resistance, luminescent properties and compatibility with organic solvents or polymer.

SUMMARY OF THE INVENTION

The above discussed and other drawbacks and deficiencies of the related art are overcome in the present invention by a protective polymer coating which attached to the rare earth ions activated alkaline earth aluminate phosphor through coordination bond. In the present invention, the polymer grafted rare earth ions activated alkaline earth aluminate long afterglow phosphor through coordination bond, characterized in that said phosphor is the product of polymerization of organic monomer on the surface of difunctional ligand coordinated rare earth ions activated alkaline earth aluminate, it has the following formula:

$$A(B)n \qquad (1)$$

wherein A is difunctional ligand coordinated rare earth ions activated alkaline earth aluminate phosphor, it is the product of the coordinative bonding between the rare earth ions activated alkaline earth aluminate and the difunctional ligands; where:

the rare earth ions activated alkaline earth aluminates have the chemical formula:

$$M_xAl_yO_z:Eu^{2+},E \qquad (2), \text{where}$$

M represents at least one earth ions selected from the groups consisting of $Ca^{2+}$, $Mg^{2+}$, $Sr^{2+}$ and $Ba^{2+}$;

E represents at least one rare earth ions selected from the groups consisting of $Ce^{3+}$, $Tb^{3+}$, $Dy^{3+}$, $Nd^{3+}$ and $Pr^{3+}$;

x is an integer from 1 to 4;

y is an integer from 2 to 14;

z is an integer from 4 to 25;

wherein the difunctional ligands are selected from the group consisting of polymerizable β-diketones, polymerizable multi-carboxylic acids and anhydrides, polymerizable amines or polymerizable heterocyclic compounds wherein B is the unit in the copolymer or homopolymer of organic monomers;

n is an integer from 1 to 1000000.

Preferably, $Eu^{2+}$ rare earth ions activated alkaline earth aluminate phosphors are: $SrAl_2O_4:Eu^{2+},Dy^{3+}$, $Sr_4Al_{14}O_{25}:Eu^{2+},Dy^{3+}$, $CaAl_2O_4:Eu^{2+},Dy^{3+}$, $CaAl_2O_4:Eu^{2+},Nd^{3+}$,  $BaAl_2O_4:Eu^{2+},Pr^{3+}$ or $MgAl_2O_4:Eu^{2+},Nd^{3+}$, preferably polymers are: transparent or translucent polymers.

Figure 1:
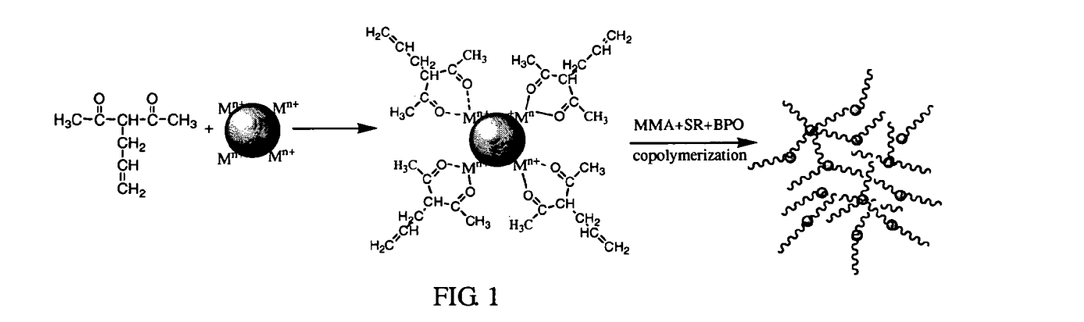
FIG. 1 is a schematic illustration of the process to prepare polymer grafted long afterglow phosphor.

The method for producing polymer grafted phosphor composed of two steps (as FIG. 1 shows). The first one is coordinating of unsaturated metal ions on the surface of aluminate phosphor with difunctional ligand to form coordinated long afterglow phosphor. The difunctional ligands have both polymerizable group and coordinating atoms such as O, N, F, Cl and Br et. al. Preferably ligands are β-diketones, multi-carboxylic acids and anhydrides, amines, heterocyclic compounds including polymerizable groups. The second step is copolymerizing of the ligand with other polymerizable monomers to form the polymer grafted long afterglow phosphor in organic solvent at 40~130° C. and at the presence of initiator.

Thus, the invention provides a method for preparing the polymer grafted rare earth ions activated alkaline earth aluminate long afterglow phosphor through coordination bond, having the formula A(B)n, defined above, comprising the steps of:

forming a coordinated rare earth ions activated alkaline earth aluminate long afterglow phosphor by the reaction between the rare earth ions activated alkaline earth aluminate MxAlyOz:Eu2+,E and the organic difunctional ligands in solvents; and 5 parts of the above coordinated aluminate phosphor is dispersed in solvents at room temperature, then the temperature is increased to 40~130° C. and the initiator was added to the reaction vessel, afterward, 0.1~500 parts of polymerizable monomer was dropped into the reaction vessel, and kept the reaction at 40~130° C. then the polymer grafted rare earth ions activated alkaline earth aluminate long afterglow phosphor is formed.

This method overcomes the poor water resistance and compatibility with organics of aluminate phosphor. Unlike other methods, a dense and strength polymer coating is formed on the surface of aluminate phosphor, which greatly enhances the water resistance and compatibility with organics of aluminate phosphor. Furthermore, the polymer grafted phosphor has good luminescence properties. The above discussed features and advantages of the present invention will be appreciated and understood by those skilled in the art from the following detailed description and drawings.

DETAILED DESCRIPTION OF THE INVENTION

In one aspect of the present invention, a process is provided for protecting aluminate phosphors from external environment such as moisture and increasing their compatibility with organics comprises use of a hydrophobic, organic polymer grafted on the surface of the phosphor. The organic polymer preferably comprises translucent or transparent polymer, which preferably formed by chain growth polymerization from a polymerizable difunctional ligand which coordinated with metal ions on the surface of aluminate phosphor. In an advantageous feature, attachment of the difunctional ligands by coordination bonding to the surface of phosphor allows tighter packing of the ligands than by physisorption. Subsequent polymerization from these ligands therefore overcomes the limitation of physisorption of polymer on the surface of phosphor particles.

Particularly, the present invention provides a kind of polymer grafted long afterglow phosphor and the method for producing the same. The polymer grafted rare earth ions activated alkaline earth aluminate long afterglow phosphor through coordination prepared by polymerization of organic monomer on the surface of difunctional ligand coordinated rare earth ions activated alkaline earth aluminate has the following formula:

$$A(B)n \quad (1)$$

wherein A is difunctional ligand coordinated rare earth ions activated alkaline earth aluminate, it is the product of the coordination reaction between rare earth ions activated alkaline earth aluminate and the difunctional ligands having both polymerizable group and coordinating atoms; B is the unit of copolymer or homopolymer from the organic monomers; n is an integer from 1 to 1000000.

The rare earth ions activated alkaline earth aluminates have the chemical formula:

$$M_xAl_yO_z:Eu^{2+},E \quad (2) \text{ where}$$

M represents at least one metal ions selected from the groups consisting of $Ca^{2+}, Mg^{2+}, Sr^{2+}$ and $Ba^{2+}$;

E represents at least one metal ions selected from the groups consisting of $Ce^{3+}, Tb^{3+}, Dy^{3+}, Nd^{3+}$ and $Pr^{3+}$;

x is an integer from 1 to 4;

y is an integer from 2 to 14;

z is an integer from 4 to 25;

preferably rare earth ions activated alkaline earth aluminates comprise $SrAl_2O_4:Eu^{2+},Dy^{3+}$, $Sr_4Al_{14}O_{25}:Eu^{2+},Dy^{3+}$, $CaAl_2O_4:Eu^{2+},Dy^{3+}$, $CaAl_2O_4:Eu^{2+}, Nd^{3+}$, $BaAl_2O_4:Eu^{2+}, Pr^{3+}$, $MgAl_2O_4:Eu^{2+},Nd^{3+}$.

In order to form tight polymer layer on the outer surface of aluminate phosphor, the difunctional ligands are attached to the surface of aluminate phosphor. The first functional group (as FIG. 1 shows) can coordinate with metal ions (such as $Al^{3+}, Sr^{2+}, Eu^{2+}$, or $Dy^{3+}$) on the surface of aluminate phosphor and leave the second functional group free for further reaction. The first functional groups include, but not limited to the groups including N, O, F, Cl, Br, and I atoms which have lone pair electrons. The second functional group is unsaturated group, represents opportunities for polymerization. Suitable difunctional ligands include, but not limited to, polymerizable β-diketones, polymerizable multi-carboxylic acids and anhydrides, polymerizable amines, polymerizable heterocyclic compounds.

The suitable polymerizable β-diketones ligands have the chemical formula:

$$(3)$$

wherein $R_1$ and $R_3$ may be the same or different, and represent hydrogen atom, substituted or unsubstituted C1~C10 alkyl, or substituted or unsubstituted phenyl, pyridine, furan or thiophene; $R_2$ represents substituted or unsubstituted polymerizable $C_1$~$C_{10}$ hydrocarbon groups, preferably comprising unsaturated bond; the substituting groups in $R_1, R_2$ and $R_3$ may be alkoxy, halogen atom, nitro, ester groups, phenyl, pyridine, furan, thiophene, or combination comprising 1~3 of the foregoings, for example:

1#

2#

3#

4#

5#

6#

7#

These ligands can react with metal ion $M^{n+}$ to form the following coordinated compound, n is 2 or 3.

The suitable polymerizable multi-carboxylic acids and anhydrides have the chemical formula: n is an integer from 1 to 6.

(4)

wherein $R_4$ represents substituted or unsubstituted polymerizable $C_1$~$C_{10}$ hydrocarbon groups, preferably comprising unsaturated bond; the substituting groups in $R_4$ may be alkoxy, halogen atom, amino, ester groups, phenyl, pyridine, furan, thiophene, or combination comprising 1~3 of the foregoings, for example:

8#

9#

10#

11#

12#

-continued

13#

14#

19#

20#

21#

22#

23#

24#

25#

The suitable polymerizable amines have the chemical formula: n is an integer from 1 to 6, (5)

wherein $R_5$ represents substituted or unsubstituted polymerizable $C_1$~$C_{10}$ hydrocarbon group, preferably comprising unsaturated bond; the substituting group in $R_5$ comprise alkoxy, halogen atom, amino, ester group, phenyl, pyridine, furan, thiophene, or combination comprising 1~3 of the foregoings, for example:

15#

16#

17#

18#

The suitable polymerizable heterocyclic compounds have the chemical formula: n is an integer from 1 to 6, (6)

wherein D represents heterocyclic compounds 19#~25#;

$R_6$ represents hydrogen atom, substituted or unsubstituted $C_1$~$C_{10}$ alkyl, phenyl, pyridine, furan, thiophene; wherein the substituting groups in $R_6$ comprise alkoxy, halogen atom, nitro, ester groups or combination comprising 1~3 of the foregoings;

$R_7$ represents substituted or unsubstituted polymerizable $C_1$~$C_{10}$ hydrocarbon group; the substituting groups in $R_7$, comprise alkoxy, halogen atom, amino, ester group, phenyl, pyridine, furan, thiophene, or combination comprising 1~3 of the foregoings.

The followings also can use as difunctional ligands

26#

27#

The above discussed difunctional ligands can react with metal ions on the surface of aluminate phosphor by coordination bonding to form coordinated long afterglow phosphor particles. And at the outer side of the phosphor particles there are polymerizable groups which can further react with other organic monomer in the presence of initiator to form polymer grafted phosphor.

Suitable initiators for use in above polymerization include, but are not limited to benzoyl peroxide, azo-isobutyric dinitrile and the like.

In order to maintain the good luminescence properties of the rare earth ions activated alkaline earth aluminate phosphor, the polymer of the present invention may have a good transparence and impact resistance, strength and thoughness. The preferably organic monomers comprise methyl methacrylate, ethyl methacrylate, butyl methacrylate, ethylene, ethylene chloride, propylene, styrene, acrylonitrile, butadiene, maleic anhydride, or combination comprising 1~3 of the foregoings, the degree of polymerization n satisfies the integer from 1 to 1000000.

The polymers comprise the polymerizing products of methyl methacrylate, ethyl methacrylate, butyl methacrylate, ethylene, ethylene chloride, propene, styrene, acrylonitrile, butadiene, maleic anhydride, or combination comprising 1~3 of the foregoings reacted with difunctional ligands on the surface of coordinated phosphor.

In one embodiment, the organic monomer is the $C_2$~$C_{10}$ alkene, for example, propene, styrene. They can copolymerize with difunctional ligand on the surface of coordinated phosphor respectively and form the following polymer grafted phosphor: n is an integer from 2 to 1000000 wherein A is difunctional ligand coordinated rare earth ions activated alkaline earth aluminate.

In another embodiment, the organic monomer is methyl methacrylate, ethyl methacrylate or butyl methacrylate. They can copolymerize with difunctional ligand on the surface of coordinated phosphor respectively and form the following polymer grafted phosphors: n is an integer from 2 to 1000000 wherein A is difunctional ligand coordinated rare earth ions activated alkaline earth aluminate.

Alternatively, the polymers may be the copolymerizing product of the combination comprising 1~3 of methyl methacrylate, ethyl methacrylate, butyl methacrylate, ethylene, ethylene chloride, propene, styrene, acrylonitrile, butadiene or maleic anhydride with difunctional ligand on the surface of coordinated phosphor as followings: n is an integer from 2 to 1000000 wherein A is difunctional ligand coordinated rare earth ions activated alkaline earth aluminate.

The process preparing the polymer grafted rare earth ions activated alkaline earth aluminate long afterglow phosphor comprises two steps:

forming a layer of small molecules (difunctional ligands) on the surface of rare earth ions activated alkaline earth aluminate long afterglow phosphor, wherein the layer has polymerizable groups external to the phosphor surface; and polymerizing other organic monomers from the polymerizable groups external to the phosphor surface by a graft polymerization to form a polymer grafted long afterglow phosphor.

The detailed process is: 5 g of $M_xAl_yO_z$:$Eu^{2+}$,E powder and ligand 0.005~25 g are stirred in 10~100 ml ethanol at 10~80° C. for 1~2 hours. 0.5~5 ml ammonia water is dropped into the reaction vessel, and keep stirring 3~6 hours. After filtering, washing and drying, the coordinated aluminate phosphor is obtained. 5 g of the above coordinated aluminate phosphor are dispersed in 10~50 ml solvents at room temperature for 1~3 hours. Then the temperature is increased to 40~130° C., 0.02~0.2 g initiator is added to the reaction vessel under $N_2$ atmosphere, then 0.1~500 g of refined organic monomer is dropped into the reaction vessel after half an hour, and keep stirring 3~72 hours at 40~130° C. After filtering, washing and drying, the polymer grafted phosphor is obtained.

The suitable solvents used in the polymerization step include, but not limited to chloroform, ethanol, hexane, the mixture of hexane and ethyl acetate, N, N-dimethyl formamide. The solvents used in the coordination step are selected from the group consisting of C1-C6 aliphatic alcohols, chloroform, ethylene dichloride, methylene dichloride, tetrahydrofuran, acetone and acetonitrile.

Figure 2:
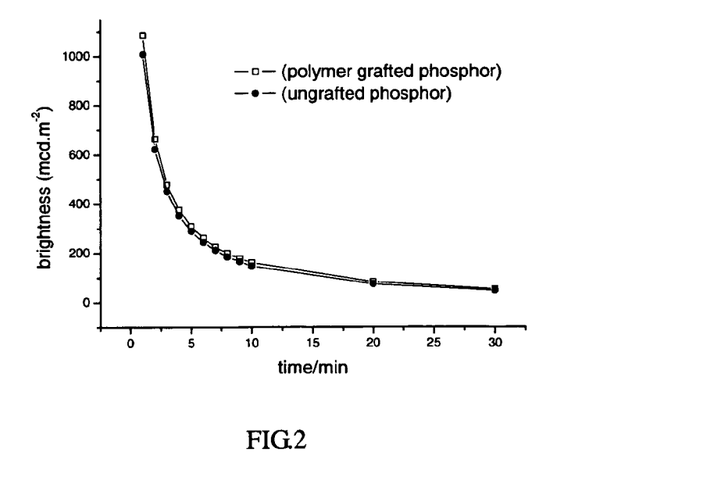
FIG. 2 is a schematic illustration of the decay curves of polymer grafted and ungrafted long afterglow phosphor.

This method overcomes the poor water resistance and compatibility with organics of the aluminate phosphors applied in the prior art. Also, it overcomes the problem of wear-off in the physically coated phosphor. Unlike other methods, a dense and strength polymer coating is formed on the surface of aluminate phosphor, which is bonded with the aluminate phosphor by coordination and graft relationship. Firstly, the alkaline earth aluminate phosphor is combined with the difunctional ligands by coordinative bonds, then the organic monomers are polymerized with the free radical on polymerizable groups of the ligands external to the phosphor surface to form a polymer grafted long afterglow phosphor, For example, as FIG. 2 shows the brightness and decay time of the polymer grafted phosphor as prepared in the Example 2 are slightly higher than that of ungrafted aluminate phosphor. The water resistance (Table 1) of the polymer grafted phosphor is greatly higher than that of ungrafted phosphor, small molecule coated phosphor and polymer coated phosphor by physisorption (as the comparative Example 2).

TABLE 1

Hydrolysis time and brightness of SAO-ED and organic-inorganic combined SAO-ED

|  | ungrafted phosphor | small molecule coated phosphor | polymer coated phosphor by physisorption | polymer grafted phosphor |
|---|---|---|---|---|
| Hydrolysis time/day | 1 | 4 | 60 | >90 |
| Brightness/mcd · $m^{-2}$ | 0 | 0 | 0 | unaltered |

EXAMPLES

The following examples are illustrative of the compositions and synthesis process of the polymer grafted phosphor of the invention. The examples are not intended to be limiting, as other inorganic phosphor, difunctional ligands, organic monomer, organic solvents and other initiators may be used in other quantities and combinations by one of ordinary skill in the art, without departing from the scope of the invention.

Example 1

Formation of a 3-allyl-2,4-pentanedione Coordinated Rare Earth Ions Activated Alkaline Earth Aluminate Phosphor 5 g of $SrAl_2O_4$:$Eu^{2+}$,$Dy^{3+}$ powders and 0.005~25 g of 1# ligand were stirred in 10~100 ml ethanol at 10~80° C. for 1~2 hours. 0.5~5 ml ammonia water was dropped into the reaction vessel, and kept stirring 3~6 hours. After filtering, washing and drying we got a 3-allyl-2,4-pentanedione coordinated rare earth ions activated alkaline earth aluminate phosphor IR spectra of the coordinated $M_xAl_yO_z$:$Eu^{2+}$,E powder show absorption at 1600 $cm^{-1}$. After the coordinated powders were washed with ethanol 10 times, the intensities of the IR absorption of the powder did not change, indicating that the ligands are strongly absorbed onto the $M_xAl_yO_z$:$Eu^{2+}$,E powder surface.

Example 2

Formation of a Styrene Polymer Grafted Phosphor 5 g of powders produced in example 1 was stirred in 10~50 ml hexane at room temperature for 1~3 hours. Then the temperature was increased to 40~130° C., 0.02~0.2 g of benzoyl peroxide was added into the reaction vessel under $N_2$ atmosphere, then 0.1~500 g of refined styrene monomer was dropped into the reaction vessel after half an hour, and kept stirring 3~72 hours at 40~130° C. After filtering, washing and drying, we got a styrene polymer grafted phosphor.

Comparative Example 2

5 g of $SrAl_2O_4$:$Eu^{2+}$,$Dy^{3+}$ powders is stirred in 10~50 ml hexane at room temperature for 1~3 hours. Then the temperature was increased to 40~130° C., 0.02~0.2 g of benzoyl peroxide was added into the reaction vessel under $N_2$ atmosphere, then 0.1~500 g of refined styrene monomer was dropped into the reaction vessel after half an hour, and kept stirring 3~72 hours at 40~130° C. After filtering, washing and drying, we got a styrene polymer grafted phosphor.

Example 3

Formation of a Surface Polymer Grafted Phosphor 5 g of powders produced in example 1 was stirred in 10~50 ml hexane at room temperature for 1~3 hours. Then the temperature was increased to 40~130° C., 0.02~0.2 g azo-isobutyric dinitrile was added into the reaction vessel under $N_2$ atmosphere, then 0.1~500 g of refined organic monomer (the organic monomers are one, two or three kinds of methyl methacrylate, ethyl methacrylate, butyl methacrylate, ethylene, chloroethylene, propylene, acrylonitrile, styrene, butadiene, or maleic acid anhydride) was dropped into the reaction vessel after half an hour, and kept stirring 3~72 hours at. 40~130° C. After filtering, washing and drying, we got a surface polymer grafted phosphor.

Examples 4~9

Formation of β-diketones Coordinated Rare Earth Ions Activated Alkaline Earth Aluminate Phosphor Examples 4~9 are similar to example 1, 5 g of $Sr_4Al_{14}O_{25}$: $Eu^{2+},Dy^{3+}$ powders are used, 2#~7# are difunctional organic ligands. Other conditions are listed in Table 2:

TABLE 2

| Example | Difunctional ligand | Dosage | Solvent | Temperature (° C.) | Ammonia Dosage (ml) |
|---|---|---|---|---|---|
| 4 | 2# | 0.05~10 g | chloroform | 20 | 0.5~5 |
| 5 | 3# | 0.005~20 g | ethanol | 40 | 0.1~2 |
| 6 | 4# | 0.05~25 g | hexane | 20 | 0.1~2 |
| 7 | 5# | 0.005~5 g | hexane | 60 | 0.5~5 |
| 8 | 6# | 0.005~10 g | chloroform | 40 | 0.5~5 |
| 9 | 7# | 0.05~20 g | ethanol | 10 | 0.5~5 |

Examples 10~15

Formation of Copolymer Grafted Phosphor 5 g of powders produced in examples 4~9 was stirred in 10~50 ml hexane at room temperature for 1~3 hours. Then the temperature was increased to 40~130° C., 0.02~0.2 g of azo-isobutyric dinitrile was added into the reaction vessel under $N_2$ atmosphere, then 0.1~500 g of refined organic monomer (the organic monomers are one, two, or three kinds of methyl methacrylate, ethyl methacrylate, butyl methacrylate, ethylene, chloroethylene, propylene, acrylonitrile, styrene, butadiene, or maleic acid anhydride) was dropped into the reaction vessel after half an hour, and kept stirring 3~72 hours at 40~130° C. After filtering, washing and drying, we got a surface polymer grafted phosphor.

Examples 16~22

Formation of Multi-carboxylic Acids and Anhydrides Coordinated Rare Earth Ions Activated Alkaline Earth Aluminate Phosphor Examples 16~22 are similar to example 1, 5 g of $CaAl_2O_4$: $Eu^{2+},Dy^{3+}$ powders are used, 8#~14# are difunctional organic ligands. Other conditions are listed in Table 3:

TABLE 3

| Example | Difunctional ligand | Dosage | Solvent | Temperature (° C.) | Ammonia Dosage (ml) |
|---|---|---|---|---|---|
| 16 | 8# | 0.05~20 g | chloroform | 10 | 0.5~5 |
| 17 | 9# | 0.005~10 g | ethanol | 40 | 0.5~5 |
| 18 | 10# | 0.05~25 g | ethanol | 80 | 0.5~5 |
| 19 | 11# | 0.005~20 g | chloroform | 60 | 0.5~5 |
| 20 | 12# | 0.005~10 g | chloroform | 30 | 0.5~5 |
| 21 | 13# | 0.05~5 g | ethanol | 20 | 0.5~5 |
| 22 | 14# | 0.05~20 g | ethanol | 70 | 0.5~5 |

Examples 23~29

Formation of a Poly Methyl Methacrylate Grafted Phosphor 5 g of powders produced in examples 16~22 was stirred in 10~50 ml chloroform at room temperature for 1~3 hours. Then the temperature was increased to 40~130° C., 0.02~0.2 g of azo-isobutyric dinitrile was added into the reaction vessel under $N_2$ atmosphere, then 0.1~500 g of refined methyl methacrylate monomer was dropped into the reaction vessel after half an hour, and kept stirring 3~72 hours at 40~130° C. After filtering, washing and drying, we got a poly methyl methacrylate grafted phosphor.

Examples 30~36

Formation of Copolymer Grafted Phosphor 5 g of powders produced in examples 16~22 was stirred in 10~50 ml chloroform at room temperature for 1~3 hours. Then the temperature was increased to 40~130° C., 0.02~0.2 g of azo-isobutyric dinitrile was added into the reaction vessel under $N_2$ atmosphere, then 0.1~500 g of refined organic monomer (the organic monomers are one, two or three kinds of methyl methacrylate, ethyl methacrylate, butyl methacrylate, ethylene, chloroethylene, propylene, acrylonitrile, styrene, butadiene, or maleic acid anhydride) was dropped into the reaction vessel after half an hour, and kept stirring 3~72 hours at 40~130° C. After filtering, washing and drying, we got a surface polymer grafted phosphor.

Examples 37~40

Formation of Amines Coordinated Rare Earth Ions Activated Alkaline Earth Aluminate Phosphor Examples 37~40 are similar to example 1, 5 g of $CaAl_2O_4$: $Eu^{2+},Nd^{3+}$ powders are used, 15#~18# are difunctional organic ligands. Other conditions are listed in Table 4:

TABLE 4

| Example | Difunctional ligand | Dosage | Solvent | Temperature (° C.) | Ammonia Dosage (ml) |
|---|---|---|---|---|---|
| 37 | 15# | 0.005~20 g | ethanol | 60 | 0.1~2 |
| 38 | 16# | 0.05~10 g | N,N-dimethyl formamide | 40 | 0.1~2 |
| 39 | 17# | 0.05~25 g | ethanol | 10 | 0.1~2 |
| 40 | 18# | 0.005~20 g | N,N-dimethyl formamide | 80 | 0.1~2 |

Examples 41~44

Formation of a Poly Ethyl Methacrylate Grafted Phosphor 5 g of powders produced in examples 37~40 was stirred in 10~50 ml mixture of acetacetic ester and hexane at room temperature for 1~3 hours. Then the temperature was increased to 40~130° C., 0.02~0.2 g of azo-isobutyric dinitrile was added into the reaction vessel under $N_2$ atmosphere, then 0.1~500 g of refined ethyl methacrylate ester monomer was dropped into the reaction vessel after half an hour, and kept stirring 3~72 hours at 40~130° C. After filtering, washing and drying, we got a poly ethyl methacrylate grafted phosphor.

Examples 45~48

Formation of Copolymer Grafted Phosphor 5 g of powders produced in examples 37~40 was stirred in 10~50 ml mixture of ethyl acetate and hexane at room temperature for 1~3 hours. Then the temperature was increased to 40~130° C., 0.02~0.2 g of azo-isobutyric dinitrile was added into the reaction vessel under $N_2$ atmosphere, then 0.1~500 g of refined organic monomer (the organic monomers are one, two, three or four kinds of methyl methacrylate, ethyl methacrylate, butyl methacrylate, ethylene, chloroethylene, propylene, acrylonitrile, styrene, butadiene, or maleic acid anhydride) was dropped into the reaction vessel after half an hour, and kept stirring 3~72 hours at 40~130° C. After filtering, washing and drying, we got a surface polymer grafted phosphor.

Examples 49~55

Formation of Heterocyclic Coordinated Rare Earth Ions Activated Alkaline Earth Aluminate Phosphor Examples 49~55 are similar to example 1, 5 g of $BaAl_2O_4$: $Eu^{2+},Pr^{3+}$ powders are used, 19#~25# are difunctional organic ligands. Other conditions are listed in Table 5:

TABLE 5

| Example | Difunctional ligand | Dosage | Solvent | Temperature (° C.) | Ammonia Dosage (ml) |
| --- | --- | --- | --- | --- | --- |
| 49 | 19# | 0.005~20 g | Hexane | 10 | 0.5~5 |
| 50 | 20# | 0.05~10 g | ethanol | 40 | 0.5~5 |
| 51 | 21# | 0.05~25 g | ethanol | 80 | 0.5~5 |
| 52 | 22# | 0.05~20 g | chloroform | 60 | 0.5~5 |
| 53 | 23# | 0.005~10 g | Hexane + ethyl acetate | 30 | 0.5~5 |
| 54 | 24# | 0.005~5 g | ethanol | 20 | 0.5~5 |
| 55 | 25# | 0.005~20 g | chloroform | 20 | 0.5~5 |

Examples 56~62

Formation of a Poly Ethyl Methacrylate Polymer Grafted Phosphor 5 g of powders produced in examples 49~55 was stirred in 10~50 ml mixture of ethyl acetate and hexane at room temperature for 1~3 hours. Then the temperature was increased to 40~130° C., 0.02~0.2 g of benzoyl peroxide was added into the reaction vessel under $N_2$ atmosphere, then 0.1~500 g of refined ethyl methacrylate ester monomer was dropped into the reaction vessel after half an hour, and kept stirring 3~72 hours at 40~130° C. After filtering, washing and drying, we got a poly ethyl methacrylate grafted phosphor.

Examples 63~69

Formation of a Surface Polymer Grafted Phosphor 5 g of powders produced in examples 49~55 was stirred in 10~50 ml mixture of ethyl acetate and hexane at room temperature for 1~3 hours. Then the temperature was increased to 40~130° C., 0.02~0.2 g of benzoyl peroxide was added into the reaction vessel under $N_2$ atmosphere, then 0.1~500 g of refined organic monomer (the organic monomers are one, two or three kinds of methyl methacrylate, ethyl methacrylate, butyl methacrylate, ethylene, chloroethylene, propylene, acrylonitrile, styrene, butadiene, or maleic acid anhydride) was added into the reaction vessel after half an hour, and kept stirring 3~72 hours at 40~130° C. After filtering, washing and drying, we got a surface polymer grafted phosphor.

Examples 70~71

Formation of a Coordinated Rare Earth Ions Activated Alkaline Earth Aluminate Phosphor with Difunctional Organic Ligand Examples 70~71 are similar to example 1, 5 g of $MgAl_2O_4$: $Eu^{2+},Nd^{3+}$ powders are used, 26#, 27# are difunctional organic ligands.

Examples 72~73

Formation of a Copolymer of Methyl Methacrylate Styrene and Propylene Grafted Phosphor 5 g of powders produced in examples 70~71 was stirred in 10~50 ml mixture of ethyl acetate and hexane at room temperature for 1~3 hours. Then the temperature was increased to 40~130° C., 0.02~0.2 g of benzoyl peroxide was added into the reaction vessel under $N_2$ atmosphere, then 0.1~500 g of refined methyl methacrylate, styrene and acrylonitrile monomer was added into the reaction vessel after half an hour, and kept stirring 3~72 hours at 40~130° C. After filtering, washing and drying, we got a copolymer of methyl methacrylate styrene and propylene grafted phosphor.

Examples 74~75

Formation of a Surface Polymer Grafted Phosphor 5 g of powders produced in examples 70~71 was stirred in 10~50 ml mixture of ethyl acetate and hexane at room temperature for 1~3 hours. Then the temperature was increased to 40~130° C., 0.02~0.2 g benzoyl peroxide was added into the reaction vessel under $N_2$ atmosphere, then 0.1~500 g of refined organic monomer (the organic monomers are one, two, or three kinds of methyl methacrylate, ethyl methacrylate, butyl methacrylate, ethylene, chloroethylene, propylene, acrylonitrile, styrene, butadiene, or maleic acid anhydride) was added into the reaction vessel after half an hour, and kept stirring 3~72 hours at 40~130° C. After filtering, washing and drying, we got a surface polymer grafted phosphor.

What claimed is:

1. A polymer grafted rare earth ions activated alkaline earth aluminate long afterglow phosphor through coordination bond, characterized in that said phosphor is the product of polymerization of organic monomer on the surface of difunctional ligand coordinated rare earth ions activated alkaline earth aluminate, it has the following formula:

$$A(B)n \quad (1)$$

wherein A is difunctional ligand coordinated rare earth ions activated alkaline earth aluminate phosphor, it is the product of the coordinative bonding between the rare earth ions activated alkaline earth aluminate and the difunctional ligands;

wherein the rare earth ions activated alkaline earth aluminates have the chemical formula:

$$M_xAl_yO_z:Eu^{2+},E \quad (2),$$

where

M represents at least one alkaline earth ions selected from the groups consisting of $Ca^{2+}$, $Mg^{2+}$, $Sr^{2+}$ and $Ba^{2+}$;

E represents at least one rare earth ions selected from the groups consisting of $Ce^{3+}$, $Tb^{3+}$, $Dy^{3+}$, $Nd^{3+}$ and $Pr^{3+}$;

x is an integer from 1 to 4;

y is an integer from 2 to 14;

z is an integer from 4 to 25;

wherein the difunctional ligands are selected from the group consisting of polymerizable β-diketones, polymerizable multi-carboxylic acids and anhydrides, polymerizable amines or polymerizable heterocyclic compounds wherein

B is the unit in the copolymer or homopolymer of organic monomers;

n is an integer from 1 to 1000000.

2. The polymer grafted rare earth ions activated alkaline earth aluminate long afterglow phosphor in claim 1, wherein the rare earth ions activated alkaline earth aluminate include, $SrAl_2O_4:Eu^{2+},Dy^{3+}$, $Sr_4Al_{14}O_{25}:Eu^{2+},Dy^{3+}$, $CaAl_2O_4:Eu^{2+}$, $Dy^{3+}$, $CaAl_2O_4:Eu^{2+},Nd^{3+}$, $BaAl_2O_4:Eu^{2+},Pr^{3+}$ or $MgAl_2O_4:Eu^{2+},Nd^{3+}$.

3. The polymer grafted rare earth ions activated alkaline earth aluminate long afterglow phosphor in claim 1, wherein the polymerizable β-diketones have the chemical formula:

(3)

wherein $R_1$ and $R_3$ may be the same or different and represent hydrogen atom, substituted or unsubstituted $C_1$~$C_{10}$ alkyl, or substituted or unsubstituted phenyl, pyridine, furan or thiophene; $R_2$ represents substituted or unsubstituted polymerizable $C_1$~$C_{10}$ hydrocarbon groups; the substituting groups in $R_1$, $R_2$, $R_3$ comprise alkoxy, halogen atom, nitro, ester group, phenyl, pyridine, furan, thiophene, or combination of 2-3 of the foregoing.

4. The polymer grafted rare earth ions activated alkaline earth aluminate long afterglow phosphor in claim 1, wherein the polymerizable multi-carboxylic acids and anhydrides have the chemical formula:

(4)

wherein $R_4$ represents substituted or unsubstituted polymerizable $C_1$~$C_{10}$ hydrocarbon group; the substituting groups in $R_4$ are selected from the group consisting of alkoxy, halogen atom, amino, ester group, phenyl, pyridine, furan, thiophene, or combination 2-3 of the foregoing; n is an integer from 1 to 6.

5. The polymer grafted rare earth ions activated alkaline earth aluminate long afterglow phosphor in claim 1, wherein the polymerizable amines have the chemical formula:

$$R_5\text{—}(NH_2)_n \quad (5)$$

wherein $R_5$ represents substituted or unsubstituted polymerizable $C_1$~$C_{10}$ hydrocarbon group; the substituting groups in $R_5$ are selected from the group consisting of alkoxy, halogen atom, amino, ester group, phenyl, pyridine, furan, thiophene, or combination 2-3 of the foregoing; n is an integer from 1 to 6.

6. The polymer grafted rare earth ions activated alkaline earth aluminate long afterglow phosphor in claim 1, wherein the polymerizable heterocyclic compounds have the chemical formula:

$$R_7\text{-}D\text{-}R_6 \quad (6)$$

wherein D represents heterocyclic compounds of

-continued $R_6$ represents hydrogen atom, substituted or unsubstituted $C_1$~$C_{10}$ alkyl, phenyl, pyridine, furan, thiophene; wherein the substituting groups in $R_6$ comprise alkoxy, halogen atom, nitro, ester groups or combinations 2-3 of the foregoing;

$R_7$ represents substituted or unsubstituted polymerizable $C_1$~$C_{10}$ hydrocarbon group; the substituting groups in $R_7$, comprise alkoxy, halogen atom, amino, ester group, phenyl, pyridine, furan, thiophene, or combinations 2-3 of the foregoing.

7. The polymer grafted rare earth ions activated alkaline earth aluminate long afterglow phosphor in claim 1, wherein the organic monomers used in the co-polymerization or homo-polymerization are selected from the group consisting of methyl methacrylate, ethyl methacrylate, butyl methacrylate, ethylene, ethylene chloride, propene, styrene, acrylonitrile, butadiene, maleic anhydride, or combinations of 2-3 of the foregoing.

8. The method of preparing the polymer grafted rare earth ions activated alkaline earth aluminate long afterglow phosphor through coordination bond, formula A(B)n in claim 1, comprising the steps of:

forming a coordinated rare earth ions activated alkaline earth aluminate long afterglow phosphor by the reaction between the rare earth ions activated alkaline earth aluminate $M_xAl_yO_z$:$Eu^{2+}$,E and the organic difunctional ligands in solvents; and 5 parts of the above coordinated aluminate phosphor is dispersed in solvents at room temperature, then the temperature is increased to 40~130° C. and the initiator was added to the reaction vessel, afterward, 0.1~500 parts of polymerizable monomer was dropped into the reaction vessel, and kept the reaction at 40~130° C. then the polymer grafted rare earth ions activated alkaline earth aluminate long afterglow phosphor is formed.

9. The method of the claim 8, in which the solvents used in the polymerization step are selected from the group consisting of chloroform, ethanol, hexane, the mixture of hexane and ethyl acetate and N,N-dimethyl formamide.

10. The method of the claim 8, in which the solvents used in the coordination step are selected from the group consisting of C1-C6 aliphatic alcohols, chloroform, ethylene dichloride, methylene dichloride, tetrahydrofuran, acetone and acetonitrile.

* * * * *